United States Patent [19]

Woo et al.

[11] Patent Number: 4,882,372

[45] Date of Patent: Nov. 21, 1989

[54] WATER-DISPERSED EPOXY/ACRYLIC COATINGS FOR PLASTIC SUBSTRATES

[75] Inventors: James T. K. Woo, Medina; Richard M. Marcinko, North Royalton, both of Ohio

[73] Assignee: The Glidden Company, Cleveland, Ohio

[21] Appl. No.: 229,461

[22] Filed: Aug. 8, 1988

[51] Int. Cl.$^4$ .................. C08L 63/00; C08L 33/14
[52] U.S. Cl. .................. 523/411; 428/319.3; 428/413
[58] Field of Search .................. 523/411

[56] References Cited

U.S. PATENT DOCUMENTS

| | | | |
|---|---|---|---|
| 4,177,179 | 12/1979 | Kurihara | 523/411 |
| 4,501,855 | 2/1985 | Noren | 523/411 |

FOREIGN PATENT DOCUMENTS

| | | | |
|---|---|---|---|
| 684839 | 4/1964 | Canada | 523/411 |
| 53-18638 | 2/1978 | Japan | 523/411 |

*Primary Examiner*—C. Warren Ivy
*Attorney, Agent, or Firm*—Thomas M. Schmitz

[57] ABSTRACT

A water-dispersed paint coating composition particularly useful for plastic substrates such as polystyrene foam comprises a polymeric binder of a functional acrylic copolymer and epoxy resin. Preferably, the epoxy resin is a coreaction product containing sorbitol. The polymers are water-dispersed and are adapted to cure and crosslink at ambient temperatures.

3 Claims, No Drawings

WATER-DISPERSED EPOXY/ACRYLIC COATINGS FOR PLASTIC SUBSTRATES

BACKGROUND OF THE INVENTION

This invention is directed to coating compositions particularly useful for coating plastics such as polystyrene foam substrates, and more particularly relates to a water-dispersed coating based on a polymeric mixture of epoxy resin and functional acrylic copolymer adapted to crosslink and cure at ambient room temperatures.

Coatings for plastic substrates such as polystyrene foam suffer from numerous deficiencies. For instance, solvent dispersed polymers ordinarily physically attack the plastic substrate. In particular, the solvent quickly attacks polystyrene foam substrates thereby rendering solvent dispersed coating compositions unusable. With water based coatings, a typical problem is poor adhesion or no adhesion to plastic substrate surfaces. Adhesion of conventional water based or water-dispersed coatings to polystyrene foam is poor and especially poor to high impact polystyrene substrates.

It now has been found that certain combinations of water dispersed acrylic copolymers containing both carboxy and tertiary amine functionality in combination with epoxy resin provide a highly desirable polymeric composition adapted to be water-dispersed and advantageously adheres to plastic substrates and especially polystyrene foam and high impact polystyrene substrates. The composition can be crosslinked and cured at ambient temperatures and provides excellent adhesion without detrimentally affecting the plastic or polystyrene substrate. The coating does not require metallic alkoxide additives or chelating agents as provided in a solvent based acrylic/epoxy coating disclosed in U.S. Pat. No. 4,558,076. The composition of this invention is water dispersed and unlike the prior art patents in that the composition of this invention includes both carboxyl and tertiary amine functionality in the same acrylic copolymer whereby the acrylic copolymer is self neutralizing and water reducible along with the epoxy resin. The advantages include low VOC, no solvent attack plastic substrates, low temperature cure, and good adhesion to plastic substrates. These and other advantages of this invention will become more apparent by referring to the detailed description of the invention and the illustrative examples.

SUMMARY OF THE INVENTION

Briefly, the invention pertains to a water dispersed, ambient cure coating composition particularly useful for coating plastic substrates. The coating contains a polymeric binder comprising an epoxy resin mixed with a functional acrylic copolymer containing both carboxy and tertiary amine functionality to render the acrylic copolymer water dispersible along with epoxy resin. The polymeric binder comprises on a weight basis between 20% and 99% acrylic copolymer with the balance being epoxy resin.

DETAILED DESCRIPTION OF THE INVENTION

The coating composition of this invention comprises a water-dispersed polymeric binder containing functional acrylic copolymer and epoxy resin.

Referring first to the functional acrylic copolymer, the copolymer comprises copolymerized ethylenically unsaturated monomers including acrylic monomer, functional carboxyl monomer, and functional amine monomer. Polymerizable ethylenically unsaturated monomers contain carbon-to-carbon unsaturation and include vinyl monomers, acrylic monomers, allylic monomers, and acrylamide monomers. Vinyl esters include vinyl acetate, vinyl propionate, vinyl butyrates, vinyl benzoates, vinyl isopropyl acetates and similar vinyl esters; vinyl halides include vinyl chloride, vinyl fluoride, and vinylidene chloride; vinyl aromatic hydrocarbons include styrene, methyl styrene and similar lower alkyl styrenes, chlorostyrene, vinyl toluene, vinyl naphthalene, divinyl benzoate, and cyclohexene; vinyl aliphatic hydrocarbon monomers include alpha olefins such as ethylene, propylene, isobutylene, and cyclohexene as well as conjugated dienes such as 1,3 butadiene, methyl-2-butadiene, 1,3-piperylene, 2,3 dimethyl butadiene, isoprene, cyclopentadiene, and dicyclopentadiene; and vinyl alkly ethers include methyl vinyl ether, isopropyl vinyl ether, n-butyl vinyl ether, and isobutyl vinyl ether.

Acrylic monomers include monomers, such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Carboxyl functionality can be introduced with ethylenic acrylic acids which include acrylic and methacrylic acid, ethacrylic acid, alpha-chloroacrylic acid, alpha-cycanoacrylic acid, crotonic acid, beta-acryloxy propionic acid, and beta-styrl acrylic acid. Amino functionality is provided by ethylenically unsaturated amino compounds. Examples of suitable ethylenically unsaturated basic amino compounds are aminoalkyl esters of acrylic and/or methacrylic acid having 1 to 6 carbon atoms in the alkyl radical such as the aminomethyl, aminoethyl, aminopropyl, aminobutyl and aminohexyl esters. Examples of other aminoalkyl esters having 1 to 6 carbon atoms in the alkly radical are those whose amino group is substituted by two identical or different alkyl groups with 1 to 4 carbon atoms such as (N,N-dimethylamino) ethyl ester, (N-methyl-N-butylamino) ethyl ester and (N,N-dimethylamino) hexyl ester. Examples of other suitable ethylenically unsaturated basic amino compounds are N-aminoalkyl acrylamides or methacrylamides. Specific examples of such compounds are aminomethylacrylamide, 1-aminoethyl-2-acrylamide, 1-aminopropyl-2-methacrylamide, N-1-(N-butylamino) propyl-(3)-acrylamide and 1-aminohexyl-(6)-acrylamide and 1-(N,N-dimethylamino)-ethyl-(2)-methacrylamide, 1-(N,N-dimethylamino)-propyl-(3)-acrylamide and 1-(N,N-dimethylamino)-hexyl-(6)-methacrylamide. Examples of other unsaturated basic amino compounds are monocyclic or bicyclic compounds having a 5-membered or 6-membered heterocyclic ring, such as those containing a vinyl group and at least one basic nitrogen atom. The basic nitrogen can also bear the vinyl group. Suitable monocyclic or bicyclic compounds are those which contain no hetero atoms other than nitrogen and for the rest consists of hydrocarbon radicals having not more than 20 carbon atoms. Specific examples are N-vinyl pyrazole, N-vinyl imidazole, N-vinyl imidazoline, N-vinyl piperidine and N-vinyl indole.

The functional acrylic copolymer comprises copolymerization monomers on a weight basis between 50% and 90% acrylic monomer, between 25% and 1% carboxyl functional monomer, between 30% and 1% amino functional monomer, with the balance being other ethylenically unsaturated monomer.

The acrylic polymer can be produced by bulk or solvent polymerization of ethylenically unsaturated monomers activated by peroxide or azo or other free radical initiator at polymerization temperatures typically between 70° C. to 170° C. and preferably between 80° C. to 120° C. Typically 0.5 to 2% peroxide initiator is utilized based on the weight of the monomers. Typical polymerization initiators can include for instance benzoyl peroxide, t-butyl hydroperoxide, tertiary butyl perbenzoate, cumene peroxide and similar peroxide polymerization catalysts which are preferred; azo initiators such as azo bisisobutyronitrile and dimethylazobisisobutyrate; as well as alkali metal persulfate or ammonium persulfates. Mercaptans can be added to provide control to molecular weight and produce copolymers of low molecular weight. Acrylic polymer can be neutralized with an amine compound to water disperse the same into water. Suitable amine compounds include for example, ammonia, triethylamine, dimethylethanolamine, monoethanolamine, diisopropanolamine, and the like and mixtures thereof. The quantity of amine agent, preferably an alkanolamine, can be more or less than that theoretically required for complete neutralization of the acrylic polymer and such quantity normally ranges between about 30% and 130% of the theoretical amount. The preferred acrylic composition, however, is self neutralizing by inclusion of the tertiary amine monomer and thus water reducible. For example, the polymer is aminated by inclusion of an amino monomer such as dimethylaminoethylmethacrylate.

Referring now to the epoxy resin useful in combination with the functional acrylic polymer in accordance with this invention, epoxy resin characterized by the epoxy group:

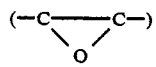

and can be represented by aromatic resin such as bisphenols reacted with epichlorohydrin, cycloaliphatic resins such as hydrogenated bisphenol based epoxy resins, and sugar type polyol, such as sorbose (or sorbitol) partially epoxidized vegetable oils. The epoxy can be a linear epoxy polymer chain although side chain adducts can be produced by coreacting epichlorohydrin with other dihydric phenols or polyhydric phenols, polyalcohols, and polyfunctional halohydrins. Epichlorohydrin and dichlorohydrin are preferred reactants with phenols to provide pendant epoxy groups. The epoxy resin should have an epoxide equivalent weight between 40 and 500 and a number average molecular weight between about 150 and 10,000. Molecular weights can be measured by GPC (gel permeation chromatography). The preferred epoxy resin is a linear polymer chain having n repeating units of epichlorohydrin adducts of various bisphenols such as bisphenol-A, bisphenol-S, etc., wherein n can be between 0 and 4. Although higher molecular weight commercial epoxy resins having molecular weights closer to 10,000 are sometimes convenient to use, a more practical method is to start with bisphenol A and the diglycidyl ether of bisphenol A, whereby the molecular weight of a liquid epoxy resin can be increased to a level that is more satisfactory for many coating applications by reacting liquid epoxy resin with additional bisphenol A or other polyalcohol materials. Higher molecular weight epoxy resin can be produced from conventional epoxy resin advanced in molecular weight by reacting low molecular weight epoxy resin with additional amounts of bisphenol-A. The epoxy polymer can be conventional epoxy polymers produced by a condensation reaction of epichlorohydrin or dichlorohydrin with bisphenols or polyhydric phenols, polyalcohols, polyfunctional halohydrins, and certain polyepoxides. Monoepoxides such as phenyl glycidyl ether are suitable although diepoxides are preferred. The epoxy polymers are produced by coreacting epichlorohydrin or dichlorohydrin with bisphenol-A to provide linear epoxy polymers having pendant epoxide groups, where preferred epoxy polymers are epichlorohydrin reacted with bisphenol-A. The epoxy polymer can be dispersed into water by coreacting with amine compounds such as ammonia, triethylamine, dimethylethanolamine, diisopropanolamine, or similar alkanolamines. Ordinarily between 30% and 130% of the amine theoretically required to neutralize the epoxy polymer is added for dispersing the epoxy polymer into water. The epoxy polymer can contain between 2 and 10 monomer units and preferably between 2 and 4 copolymerized monomer units wherein the resulting epoxy polymer can be either a mono or diepoxide or polyepoxide polymer.

A preferred epoxy resin comprises a coreaction product of sorbitol and epichlorohydrin where between 1 and 6 molecules of epichlorohydrin can be reacted with available hydroxyl groups on the sorbitol to provide terminal epoxy groups. Desirable epoxy reins contain between 3 and 5 substituted epichlorohydrin chains and most preferably on an average of 4 molecules of epichlorohydrins reacted with one molecule of sorbitol. A useful and preferred commercial epoxy sorbitol containing 4 molecules of epichlorohydrin reacted with one molecule of sorbitol is Araldite XUGY 358 epoxy resin from Ciba-Geigy.

The thermosetting polymeric binder for the paint coating comprises on a weight basis between 20% and 99% acrylic copolymer and preferably between 80% and 90% acrylic copolymer, with the balance being epoxy resin, where the respective polymers are dispersed into water. The merits of this invention and particularly the application of the coating comprising functional acrylic polymer and epoxy polymer useful as a coating on plastic substrates such as polystyrene foam and high impact styrene are further illustrated in the following examples.

EXAMPLE 1

Preparation of acrylic polymer with butanol and butyl cellosolve as solvents.

Into a 5 liter 4-necked round bottom flask was charged 750 g. of n-butanol. The reaction flask was fitted with nitrogen inlet, water-cooled condenser, agitation and a thermometer. The solvent is heated to 85° C. under a nitrogen blanket. A monomer mixture of the following was prepared:

|  | Grams |
| --- | --- |
| Styrene | 375 |
| Methyl methacrylate | 450 |
| Butyl Acrylate | 495 |
| Acrylic acid | 75 |
| Dimethylaminoethylmethacrylate | 105 |
| Azobis catalyst 2 methyl propanenitrile,2,2'-azobis (VAZO 64) | 7.5 |

300 g. of this monomer mixture was added into the reaction flask in 11 minutes and held at 85° C. for ½ hour. The remaining monomer mixture was slowly added to the polymerization medium in ½ hours. During the addition of the monomer, two shots of 7.5 g. of VAZO 64 were added at ½ hour intervals. After all the monomer is added, the polymerization mixture was held at 85° C. for one hour. After the hold, three chaser of 3 g. of VAZO 64 each were added at two hour intervals. After the chaser steps, 750 g. of butyl cellosolve was added and polymerization stopped. The nonvolatile (NV) of the solution was 47.9%, Gardner-Holt viscosity was Z4, acid number: 36 and base number 23.7.

EXAMPLE 2

Preparation of acrylic polymer with VAZO 67 as initiator.

Into a 5 liter 4-necked round bottom flask was charged 600 g. of n-butanol and heated under nitrogen blanket with agitation to 105° C. A monomer mixture consisting of the following was prepared:

|  | Grams |
| --- | --- |
| Styrene | 375 |
| Methyl methacrylate | 450 |
| Butyl acrylate | 495 |
| Dimethylaminoethylmethacrylate | 105 |
| Acrylic acid | 75 |
| Azobis catalyst, azo-bis methyl, butyl nitrile (VAZO 67) | 7.5 |

300 g. of this monomer mix was added to the hot solvent in 8 minutes and the reaction mixture held for ½ hour. The rest of the monomer mix is then added in ½ hour. During the monomer addition two shots of 7.5 g. of VAZO 67 were added at ½ hour intervals. After the addition of the monomer, the polymerization mixture was held at 105° C. for 2 hours. Then 4 chasers of 3 g of VAZO 67 were added at 2 hour intervals. At the end of the hold for the last chaser, 400 g. of butyl cellosolve was then added. The NV of the resin is 50.6, and acid number 35.7 and base number is 36.1.

EXAMPLE 3

Preparation of acrylic polymer using t-butyl peroctoate as initiator.

Into a 5 liter 4 necked round bottom flask is charged 854 g. of n-butanol and heated under nitrogen blanket with agitation to 104° C. A monomer mixture of the following was prepared:

|  | Grams |
| --- | --- |
| Styrene | 534 |
| Methyl methacrylate | 450 |
| Butyl acrylate | 704 |
| Dimethylaminoethylmethacrylate | 149 |
| Acrylic acid | 107 |

One fifth of the above monomer mixture was added to the hot butanol followed by a solution of 12.8 g. of 50:50 tertbutyl peroctoate and butyl cellosolve. This above reaction mixture was mixed for ½ hour before the rest of the monomer mixture and 51.4 g. of a 50-50 tert-butyl peroctoate-butyl cellosolve were added over ½ hours. After the addition of the monomer and initiator solution, the reaction mixture was held at 105° C. for 2 hours. After the hold, a solution of 17.2 g. of tert-butyl peroctoate and 172 g. of butyl cellosolve was added in 3 increments at 1 hour intervals. The first was 25% of total, the second was 50% of total and the third was 25% of total. After the last chaser, the reaction mixture was held at 105° C. for 1 hour before 76 g. of butyl cellosolve as added. The NV was 51.7%, viscosity is Z ½ as is, x at 40% NV butyl cellosolve, acid number is 37.9 and base number is 38.2.

EXAMPLE 4

Preparation of acrylic polymer with only acid functionalities.

Into a 5-liter 4 necked round bottom flask was charged 700 g. of n-butanol which was heated under nitrogen blanket with agitation to 85° C. A monomer mixture of the following was prepared:

|  | Grams |
| --- | --- |
| Styrene | 546 |
| Methyl methacrylate | 651 |
| Butyl acrylate | 693 |
| Acrylic acid | 210 |
| VAZO 64 | 10.5 |

420 g. of this monomer mix was added into the hot butanol in 10 minutes, and the reaction mixture held at 85° C. for ½ hour. Then the rest of the monomer was added in ½ hour. During the monomer addition, 2 chasers of 10.5 g. of VAZO 64 each were added at ½ hour interval. After the monomer addition, the polymerization mixture was held at 85° C. for 1 hour. At the end of 1 hour hold, 4 chasers of 4.2 g. each of VAZO 64 were added at 2 hour intervals. After all the chasers were added, 700 g. of butyl cellosolve was added. The NV of the resin is 60%, viscosity (ICI) of 372 poise at room temperature and acid number 69.9.

EXAMPLE 5

Preparation of acrylic polymer with only amino monomer.

Into a 5 liter 4 necked round bottom flask was charged 700 g. of n-butanol which was heated under nitrogen blanket with agitation to 85° C. A monomer mixture of the following was prepared.

|  | Grams |
| --- | --- |
| Styrene | 462 |
| Methyl methacrylate | 651 |
| Butyl acrylate | 693 |

-continued

| | Grams |
|---|---|
| Dimethylaminoethylmethacrylate | 294 |
| VAZO 64 | 10.5 |

The addition of monomer and chasers were carried out similar to those of Example 4. The NV of the resin was 59.6. ICI viscosity 155 poise at room temperature, base number 44.9.

EXAMPLE 6

Preparation of acrylic polymer with both acid and amino monomers.

Into a 5 liter round bottom flask was charged 679 g. of butyl cellosolve and 452 g. of n-butanol. The solvent mixture was heated to 75° C. with nitrogen sparge and with agitation. A monomer mix of the following was prepared:

| | Grams |
|---|---|
| Styrene | 525 |
| Methylmethacrylate | 630 |
| Butyl acrylate | 693 |
| Dimethylaminoethylmethacrylate | 147 |
| Acrylic acid | 105 |
| VAZO 64 | 31.5 |

20% of this monomer mix was added in 10 minutes, and the reaction mixture was held for ½ hour. The remaining of the monomer was then added over ½ hour. After the monomer addition, the polymerization mixture was held at approximately 75° C. for 2 hours. After the hold, a chaser of 4.2 g. of VAZO 64 was added and the polymerization mixture held for 2 hours, and the temperature was allowed to rise to 85° C. whereby three more chasers of 4.2 g. of VAZO 64 were added with 2 hour hold after each addition. The NV of this resin is 65.4%, Gardner-Holt viscosity was V, AN 35.7 and BN 23.9.

EXAMPLE 7

Preparation of TiO$_2$ dispersion.
Formula used to make the white dispersion is listed in the following:

| | Grams |
|---|---|
| Deionized water | 184 |
| *Bentone LT (N&L Industries) | 1.2 |
| **Surfynol TG (Air Products) | 4.0 |
| ***Tamol 731 (Rohm & Haas) | 16.2 |
| Dimethylethanolamine | 1.8 |
| Titanium dioxide | 660 |
| | 867.2 g. |

*Bentone LT is a thickener for grinding aid.
**Surfynol TG; surfactant
***Tamol 731; surfactant Dispersion was made easily and had Hegman fineness gauge of 7+. The NV of the dispersion is 77.1% and the theoretical weight per gallon of this dispersion is 19.4.

EXAMPLE 8

Preparation of white paint.
The following formula was used to make a white paint:

| | Grams |
|---|---|
| Polymer form Ex. 2 | 350 |
| Deionized water | 350 |
| Drewplus (TM) Y-250 (Drew Chemical) (defoamer) | 2.2 |
| Dispersion from Ex. 7 | 197.6 |
| | 899.8 |

The theoretical NV of this paint is 36.8%. Viscosity of the paint is 67 K.U. (Krebs Units) at 80° F. To 350 g. of this white paint is now added 21.6 g. of epoxy resin Araldite XUGY 358 (Ciba Geigy), (epoxy sorbitol comprising 4 molecules of epichlorohydrin coreacted with 1 molecule of sorbitol) 3.1 g. of butyl cellosolve and 52.1 g. of deionized water. The NV of this paint is now 33.6% and viscosity is 22 seconds, Zahn Cup. This paint is now sprayed onto various plastic substrates, and the data is summarized in the following table:

| | Cure as measured by MEK rubs | | | Adhesion | | |
|---|---|---|---|---|---|---|
| | SMC | ABS | Noryl | SMC | ABS | Noryl |
| Baked at 10 min. at 250° F. | 28 | 30 | 25 | 100% | 50% | 100% |
| Baked at 20 min. at 250° F. | 200 | 200 | 58 | 98% | 100% | 100% |
| Baked at 30 min. | 24 | 35 | −35 | 95% | 90% | 100% |

SMC: Sheet molding compound
ABS: Acrylonitrile-butadiene-styrene terpolymer
Noryl: Polyphenylene ether oxide.(G.E.)

EXAMPLE 9

Preparation of Black paint
The following formula is used to make a black paint. The paint was made in a cowles.

| | Grams |
|---|---|
| Deionized water | 300 |
| Bentone LT | 0.65 |
| Tamol 731 | 20.4 |
| Surfynol TG | 10.2 |
| Dimethylethanolamine | 3.1 |
| Carbon Black | 30 |
| Deionized water | 13.7 |
| Polymer from Ex. 3 | 290 |
| Butyl Cellosolve | 5 |
| Deionized Water | 226.4 |
| Mineral Spirit | 2.1 |
| Hexyl Cellosolve | 2.8 |
| Ethylene Glycol | 11.3 |
| Drewplus (TM) Y- 250 | 0.5 |
| | 916.1 g. |

The Hegman reading is 6+, and theoretical NV of this paint is 21.3%. To 150 g. of the above paint was added 6.8 g. of an epoxy resin Araldite XUGY358, 17.4 g of deionized water and 0.38 g. of Drewplus (TM) Y-250. The paint was used to spray on SMC with first about 0.4 mil thick (dry paint), and allowed to remain in the spray booth for 5 minutes.

After which time, more paint was applied so that the dry film thickness is now 0.75 mil. The appearance of the coating was very good. The coating was baked at 20 min. at 250° F. The MEK rubs of 35 was obtained and #250 tape adhesion was 100%, that is excellent.

EXAMPLE 10

Using polymer from Ex. 4, following white paint was prepared:

| Grind: | Grams |
|---|---|
| Acrylic polymer from Ex. 4 | 400 |
| Dimethylethanolamine | 13.3 |
| Deionized Water | 205 |
| Titanium Dioxide | 200 |
| Deionized Water | 150 |
| | 968.3 g. |

Hegman = 7
Total solids = 45.4%
Resin solids = 24.8%

| Let down: | Grams |
|---|---|
| Grind from above | 150 |
| Araldite XUGY 358 | 9.5 |
| Deionized water | 38 |

The above paint was sprayed on SMC panels, and properties are summarized in the following table:

| | 20 min. 225° F. | 20 min. 160° F. |
|---|---|---|
| Hardness | 2H | F |
| MEK Rubs (Double) | 22 | 5 |
| Adhesion | 100% | 100% |

EXAMPLE 11

Using polymer from Ex. 5, the following white paint was prepared:

| Grind: | Grams |
|---|---|
| Acrylic polymer from Ex.5 | 350 |
| Acetic acid(50% solution) | 10 |
| Deionized water | 110 |
| Titanium Dioxide | 172 |
| Deionized Water | 300 |
| | 942 g. |

Hegman = 7
Total solids = 40.4%
Resin solids = 22.1%

| Let down: | Grams |
|---|---|
| Grind from above | 150 |
| Araldite XUGY 358 | 8.5 |
| Deionized water | 36.4 |

The above paint was sprayed on SMC panels, and properties are summarized in the following table:

| | 20 min. 225° F. | 20 min. 160° F. |
|---|---|---|
| Hardness | 2H | HB |
| MEK Rubs | 6 | 2 |
| Adhesion | 100% | 100% |

EXAMPLE 12

A grind is made by the following recipe:

| | Grams |
|---|---|
| Resin from Ex. 1 | 425 |
| Dimethylethanolamine | 5.8 |
| Deionized water | 66.9 |
| yellow iron oxide | 191.6 |
| deionized water | 144.7 |
| | 834 g. (theoretical NV 47.4%) |

Now a yellow paint was made by taking 144 g. of the above grind and to it was added 6.2 g. of the sorbitol epoxy resin Araldite XUGY 358 and 45 g. of deionized water. This coating when applied to the following substrates by draw down:

PVC
High impact polystyrene
Polycarbonate
Styrofoam cup has excellent adhesion to these substrates. The coating was air dried overnight for PVC and high impact polystyrene and baked at 30 min. @170° F. for polycarbonate and styrofoam.

This coating an also be spray applied to SMC, baked at 30 min. @170° F. with good adhesion, developing a F pencil hardness within 24 hours.

This coating can also be spray applied to styrofoam without any dissolution of styrofoam.

We claim:

1. A water dispersed, ambient curable paint coating composition to be applied, the paint coating composition containing a thermosetting polymeric binder comprising on a polymer weight basis:

between 20% and 99% acrylic copolymer of copolymerized ethylenically unsaturated monomers comprising by weight 50% and 90% acrylic monomer, between 1% and 25% carboxyl functional monomer, between 1% and 30% of tertiary amine functional monomer, with the balance being other ethylenically unsaturated monomer, where said acrylic copolymer is self-neutralizing and dispersible into water due to the tertiary amino functional groups of the copolymerized tertiary amine functional monomer;

between 1% and 80% epoxy resin comprising the coreaction product of three to five molecules of epichlorohydrin reacted with one molecule of sorbitol, where said epoxy resin is adapted to crosslink with said acrylic copolymer upon curing, said epoxy resin coreacted with sufficient alkanolamine compound to render the epoxy resin water dispersible;

where said acrylic copolymer and said epoxy resin are dispersed into water; and to a plastic substrate and said polymer binder is thermosetting at ambient temperatures.

2. The coating composition in claim 1 where the polymeric binder comprises between 80% and 90% by weight said acrylic copolymer with the balance being said epoxy resin.

3. The composition in claim 1 where the epoxy resin coreaction product comprises approximately four molecules of epichlorohydrin reacted with one molecule of sorbitol.

* * * * *